United States Patent
Park

(10) Patent No.: US 6,273,225 B1
(45) Date of Patent: Aug. 14, 2001

(54) MULTIPURPOSE WIRE WINDING DEVICE FOR VEHICLES

(76) Inventor: Suk Kue Park, Ga Dong 608, WonHeung APT, 337-11, GaeSan-3Dong, Gae Yang-Ku, InChun-City, 407-053 (KR)

( * ) Notice: Subject to any disclaimer, the term of this patent is extended or adjusted under 35 U.S.C. 154(b) by 0 days.

(21) Appl. No.: 09/377,901

(22) Filed: Aug. 20, 1999

(30) Foreign Application Priority Data

Aug. 21, 1998 (KR) .................................................. 98-15694

(51) Int. Cl.$^7$ .................................................. H02G 11/00
(52) U.S. Cl. ..................................... 191/12.2 R; 191/12.4
(58) Field of Search ............................ 191/12 R, 12.2 A, 191/12.2 R, 12.4

(56) References Cited

U.S. PATENT DOCUMENTS

| | | | | |
|---|---|---|---|---|
| 4,042,082 | * | 8/1977 | Hellmiss et al. | 191/12.2 A |
| 5,645,147 | * | 7/1997 | Kovacik et al. | 191/12.2 R |
| 5,671,833 | * | 9/1997 | Edwards et al. | 191/12.2 R |
| 5,775,473 | * | 7/1998 | Cordero | 191/12 R |

\* cited by examiner

Primary Examiner—S. Joseph Morano
Assistant Examiner—Robert J. McCarry, Jr.
(74) Attorney, Agent, or Firm—McDermott, Will & Emery

(57) ABSTRACT

There is disclosed a multipurpose wire winding device for vehicles, comprising: a fixing housing having a coax hole and a cylinder-shaped reception space of a predetermined size; a rotary drum provided in the reception space, having a winding area in which a wire is winded in a circumferential direction; a cover combined with an opening of the reception space, for preventing the rotary drum drifting away; a driving unit disposed in the proximity of an outer side of the cover and coupled to the coax hole of the rotary drum, for driving the rotary drum to rotate; a cigar jack plug disposed at an end of the wire winded around the rotary drum and connected to a power supply of the vehicle; a power connecting unit for electrically connecting the wire of the rotary drum to the fixing housing such that the rotary drum and the fixing housing can reciprocally move; and a power outlet portion for outward supplying the power applied from the power connecting unit.

6 Claims, 6 Drawing Sheets

MULTIPURPOSE WIRE WINDING DEVICE FOR VEHICLES

BACKGROUND OF THE INVENTION

1. Field of the Invention

The present invention relates to a multipurpose wire winding device for vehicles and more particularly to a multipurpose vehicle wire winding device for allowing power voltage of a vehicle to be supplied for the various purposes intended by a user.

2. Description of Related Art

As well known, a typical wire winding device is used for supplying power voltage from an existing electric terminal to a working place at a predetermined distance, whereby allowing necessary works to be carried out, such as extinguishing a fire or performing moving operations in an industrial site, or serving for applications (outdoor or emergency power supply and lighting) available from a vehicle.

As industry has been developed, convenience of automobiles and increase of the national income results in rapid spread of vehicles. Many persons drive the vehicles by themselves and experience various accidents or breakdowns during the driving. Especially, when a vehicle running long distance or on an expressway at night has a flat tire or other troubles, a driver stops the vehicle on the road and must take measures necessary for preventing a secondary accident with other following vehicles or for repairing the vehicle. In this situation, the driver usually uses a flashlight powered by battery. However, the flashlight is limited in time depending upon a life of the typical battery, so brightness of the flashlight gradually lowers, resulting in inconvenience and difficulty in use.

There are inconveniences in that power voltage cannot be supplied to operate an amplifier in case of outdoor events and a light cannot be given for a long time at night in case of enjoying leisure time such as fishing when using the conventional wire winding device.

SUMMARY OF THE INVENTION

Accordingly, the present invention is directed to a multipurpose vehicle wire winding device that substantially obviates one or more of the limitations and disadvantages of the related art.

An objective of the present invention is to provide a multipurpose vehicle wire winding device for allowing power voltage of a vehicle to be supplied to a remote place so as to light up lightings or drive other electrical machines.

Additional features and advantages of the invention will be set forth in the following description, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, a multipurpose wire winding device for It is preferable to further comprise a lighting unit for receiving the power from the power connecting unit and giving light of a predetermined brightness to an outside.

It is preferable that the lighting unit includes at least one of a flasher and a lighting.

It is preferable that the driving unit is implemented in the form of either a manual driving unit or an automatic driving unit, the manual driving unit being activated in such a manner that a user rotates the manual driving unit with his/her hand in the circumferential direction, the automatic driving unit being activated by a predetermined torque generated from the power of the power connecting unit.

It is preferable that the manual driving unit comprises: a circular plate of a predetermined size connected to the coax hole of the rotary drum; and a projecting grip formed at an edge of the circular plate, for allowing rotary power to be applied in a relatively large circumferential direction.

It is preferable that the automatic driving unit comprises: a power transmission gear connected to the coax hole of the rotary drum, for transmitting a torque generated from the outside; and a motor for generating the torque to the power transmission gear with power applied from the power connecting unit.

It is preferable that the power connecting unit comprises: a rotary body connecting unit which is formed to be oriented to the coax hole at one side on a bottom surface of the winding area of the rotary drum and which has at least one contact brush electrically connected to the wire; and at least one fixed body connecting unit combined with the coax hole of the fixing housing and electrically connected to the contact brush of the rotary body connecting unit such that the fixed body connecting unit and the contact brush can reciprocally move.

It is preferable that the power outlet portion is provided with either a cigar jack receptacle or a socket.

It is preferable that the fixing housing is provided with a wire arrangement portion in an upper part of the reception space, for uniformly arranging the wire in the winding area of the rotary drum.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 1(a) and 1(b) are perspective views for showing an entire multipurpose wire winding device according to the present invention;

DETAILED DESCRIPTION OF PREFERRED EMBODIMENT

Reference will now be made in detail to the preferred embodiments of the present invention, examples of which are illustrated in the accompanying drawings.

Figure 1A:
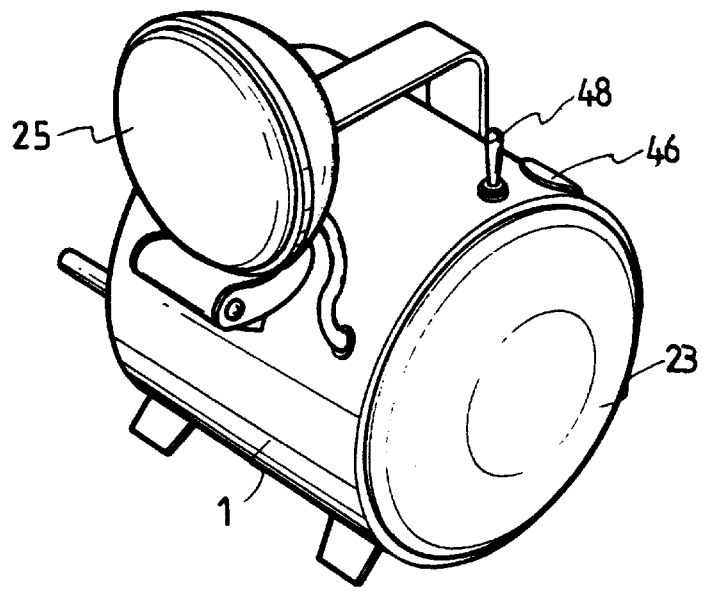
Figure 1B:
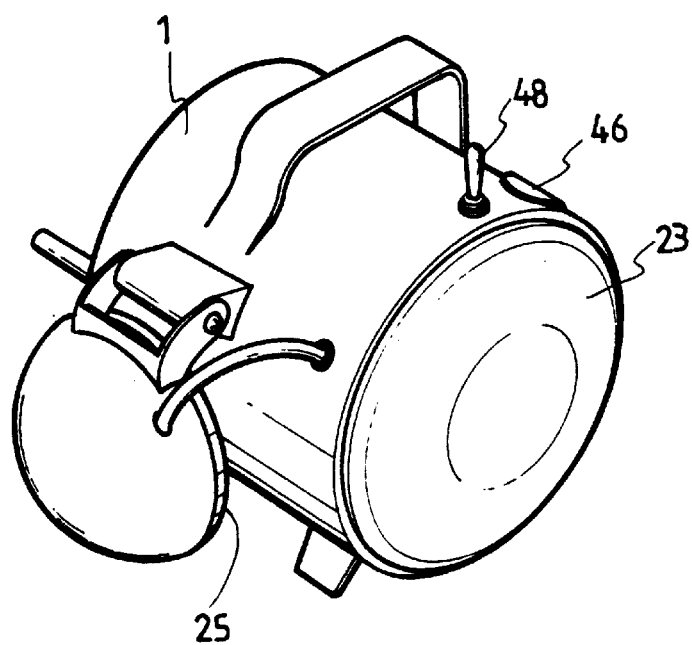
Figure 2:
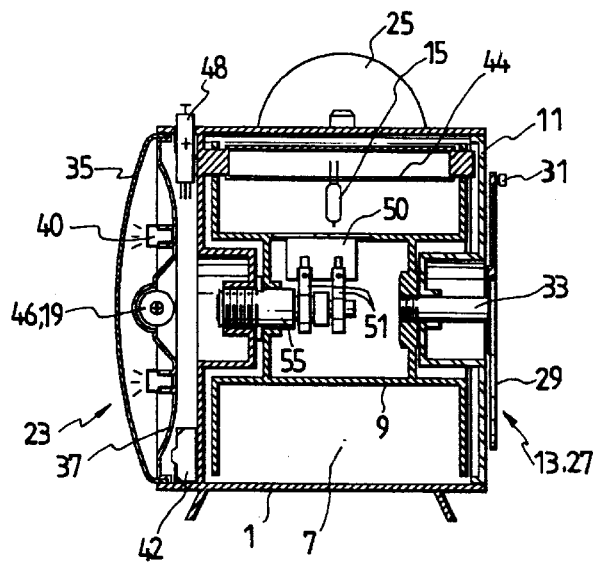
FIG. 2 is a vertical sectional view taken along the center of FIG. 1.
Figure 3:
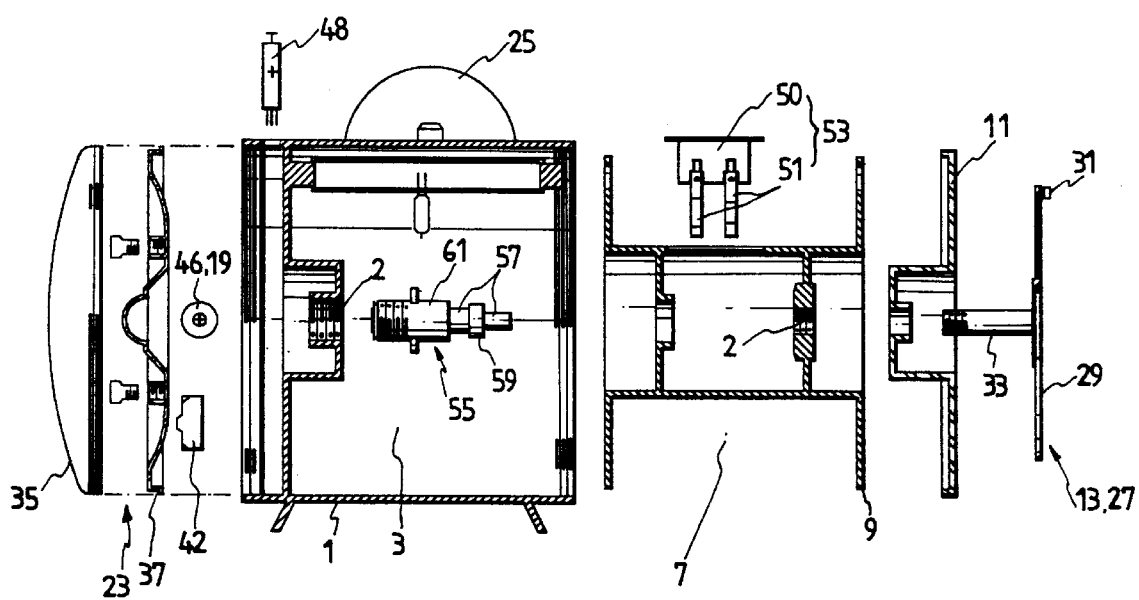
FIG. 3 is a detailed, exploded sectional view of FIG. 2.
Figure 4:
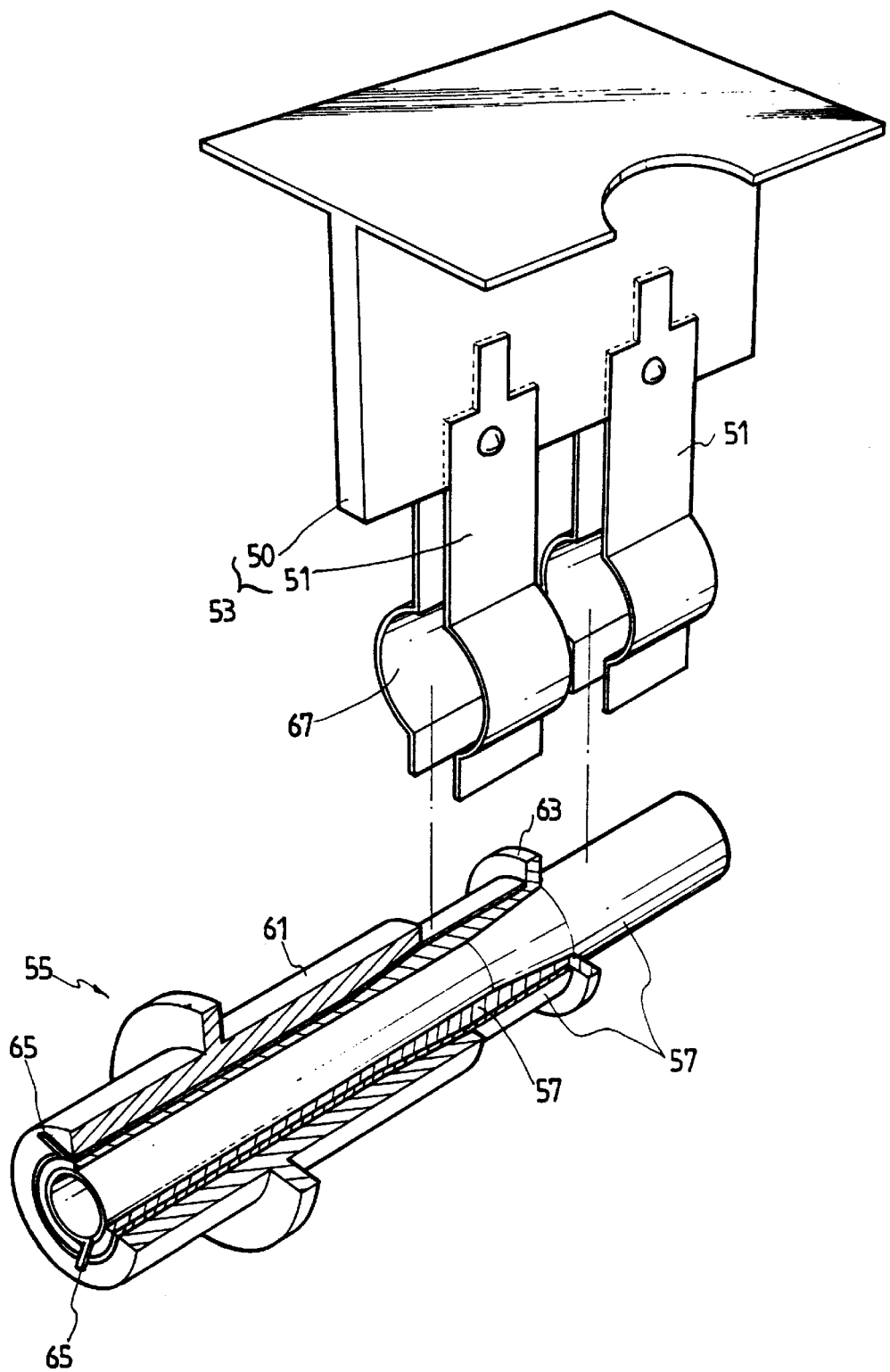
FIG. 4 is an exploded perspective view showing a power connecting unit of FIG. 2.

With reference to the accompanying drawings, a multipurpose vehicle wire winding device according to the present invention will be described in detail. FIGS. 1(a) and 1(b) are perspective views for showing an entire multipurpose wire winding device according to the present invention. FIG. 2 is a vertical sectional view taken along the center of FIG. 1. FIG. 3 is a detailed, exploded sectional view of FIG. 2. FIG. 4 is an exploded perspective view showing a power connecting unit of FIG. 2.

The multipurpose wire winding device of the present invention is for allowing electric power to be supplied from a battery (not shown) provided in a vehicle or a commercial power supply (not shown). Referring to FIGS. 1 to 3, the wire winding device of the present invention comprises: a fixing housing 1 having a cylindrical reception space 3 of a predetermined size provided with a pivot hole (hereinafter, called as a coax hole) 2 at its center and an opening at its one side; a rotary drum 9 which is received into the reception space 3 allowing linear connection of the coax hole 2 and which is provided with a winding area 7 of a wire 5 of a predetermined length, the winding area being formed along a circumference; a cover 11 combined with the opening of the reception space 3, for preventing the rotary drum 9 drifting away from the reception space 3; a driving unit 13 disposed in the proximity of an outer side of the cover 11 and coupled to the coax hole 2 of the rotary drum 9, for driving the rotary drum 9 to rotate; a cigar jack plug 15 (i.e., a plug) formed at an end of the wire winded around the rotary drum 9 and connected to a power supply of the battery in the vehicle; a power connecting unit 17 for electrically connecting the wire 5 of the rotary drum 9 to the fixing housing 1 such that the rotary drum 9 and the fixing housing 1 can reciprocally move; and a power outlet portion 19 for outward supplying the power applied across the cigar jack plug 15 and the power connecting unit 17. In this occasion, the coax hole 2 is provided in the fixing housing 1 and the cover 11.

The power connecting unit 17 is connected to a lighting unit 21 for giving outward a light of a predetermined brightness. The lighting unit 21 is provided with either a flasher 23 used for warning following vehicles in case of breakdown of a vehicle or emergency or a lighting 25 for giving a light when necessary at night. The lighting 25 is disposed to move up and down in the outer side of the fixing housing 1.

The driving unit 13 is sliding-connected into the coax hole 2 of the cover 11 and fixedly coupled to the coax hole 2 of the rotary drum 9 so as to drive the rotary drum 9 to rotate. The driving unit 13 is made in the form of a manual driving unit 27 driven in such a manner that a user rotates the driving unit 27 clockwise with his/her hand. The manual driving unit 27 includes a circular plate 29 of a predetermined size screw-connected to the coax hole 2 of the rotary drum 9 and a projecting grip 31, or handle, at an edge of the circular plate 29, for delivering a rotary power to the circular plate 29 in a relatively large circumferential direction. A hollow shaft 33 is provided between the circular plate 29 and the coax hole 2 to fixedly screw-connect the two parts.

The flasher 23 is formed at the other side opposite to the cover 11 combined with the fixing housing 1. The flasher 23 includes a dome-shaped transparent plate 35 and a reflecting plate 37 of circular shape provided at the inner side of the transparent plate 35. A predetermined area in the reflecting plate 37 is provided with at least one bulb 40 supplied with the power from the power connecting unit 17, for emitting light of the specified brightness. A switch relay 42 is provided between the reflecting plate 37 and the fixing housing 1, for intermittently supplying the power to the bulb 40.

The power outlet portion 19 is disposed at one outer side of the fixing housing 1. The fixing housing is provided with a wire leading aperture 44 through which the wire is led passing through the inner and outer portions of the reception space. The power outlet portion 19 is provided with at least one of a cigar jack receptacle 36 and a socket for receiving an outer cigar jack plug to transmit power. The fixing housing 1 is provided with a starting switch 48 at a predetermined distance from the power outlet portion 19, for selectively starting the lighting 25 and the flasher 23 in the lighting unit 21.

Referring to FIG. 4, the power connecting unit 17 comprises: a rotary body connecting unit 53 including an insulating bracket 50 formed to be oriented to a center of a coax hole at one side on the bottom surface of the winding area of the rotary drum 9 and at least one contact brush 51 fixed to the bracket 50 so as to be electrically connected to the wire 5; and at least one fixed body connecting unit 55 which is coupled to the coax hole of the fixing housing 1 and electrically roll-connected to the contact brush 51 such that the fixed body connecting unit 55 and the contact brush 51 can reciprocally move. Here, the contact brush 51 is provided with a pair of brushes usually having different lengths and radii.

The fixed body connecting unit 55 includes a pair of conductive cylindrical contact portions 57 having different radii. A first cylindrical insulator 59 is provided with between the two cylindrical contact portions 57 for electrical insulation between them. A second cylindrical insulator 61 is disposed around an outer surface of the cylindrical contact portion 57 having the relatively larger radius for insulation from the outside and is screw-connected to the coax hole 2 of the fixing housing 1. The first cylindrical insulator 59 has a preventive sill 63 projecting from an end thereof for preventing short cut between the contact brushes 53. The pair of cylindrical contact portions 57 have conductive connection protrusions 65 facing each other at their one ends, for applying the power to the power outlet portion 19 or the lighting unit 21 and starting switch 48. For the contact brush 51, one end is fixed to the bracket 50 and the other end has a cylindrical contact hole 67 for receiving the pair of cylindrical contact portions 57 to be sliding-connected thereto.

Figure 5:
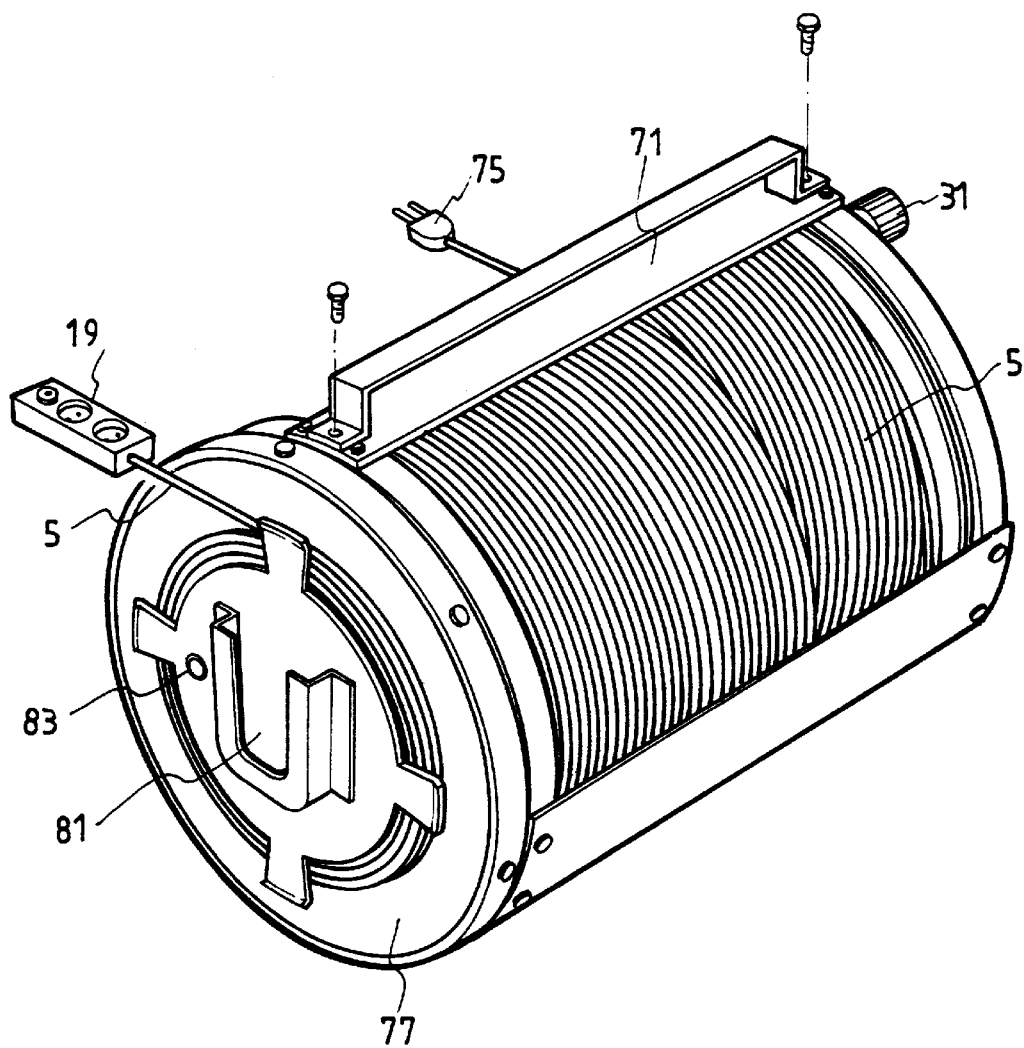
FIG. 5 is an overall perspective view for showing another embodiment of a multipurpose wire winding device according to the present invention.
Figure 6:
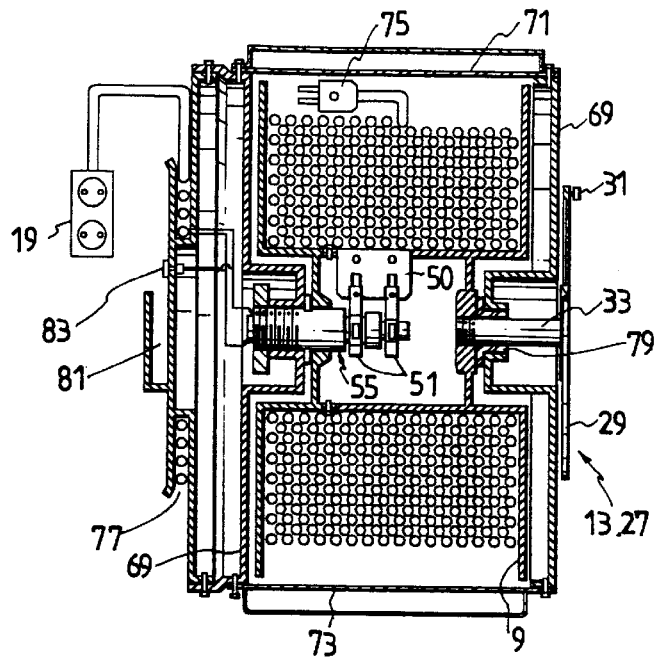
FIG. 6 is a vertical sectional view taken along the center of FIG. 5.
Figure 7:
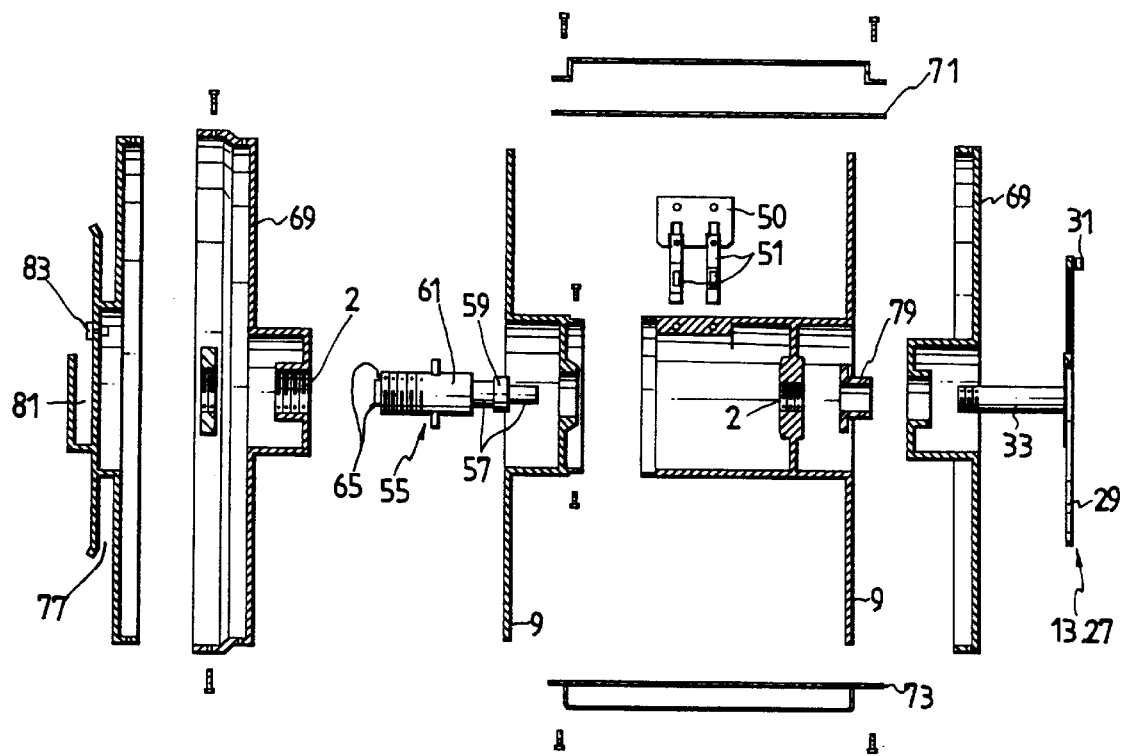
FIG. 7 is a detailed, exploded sectional view of FIG. 5.
Figure 8:
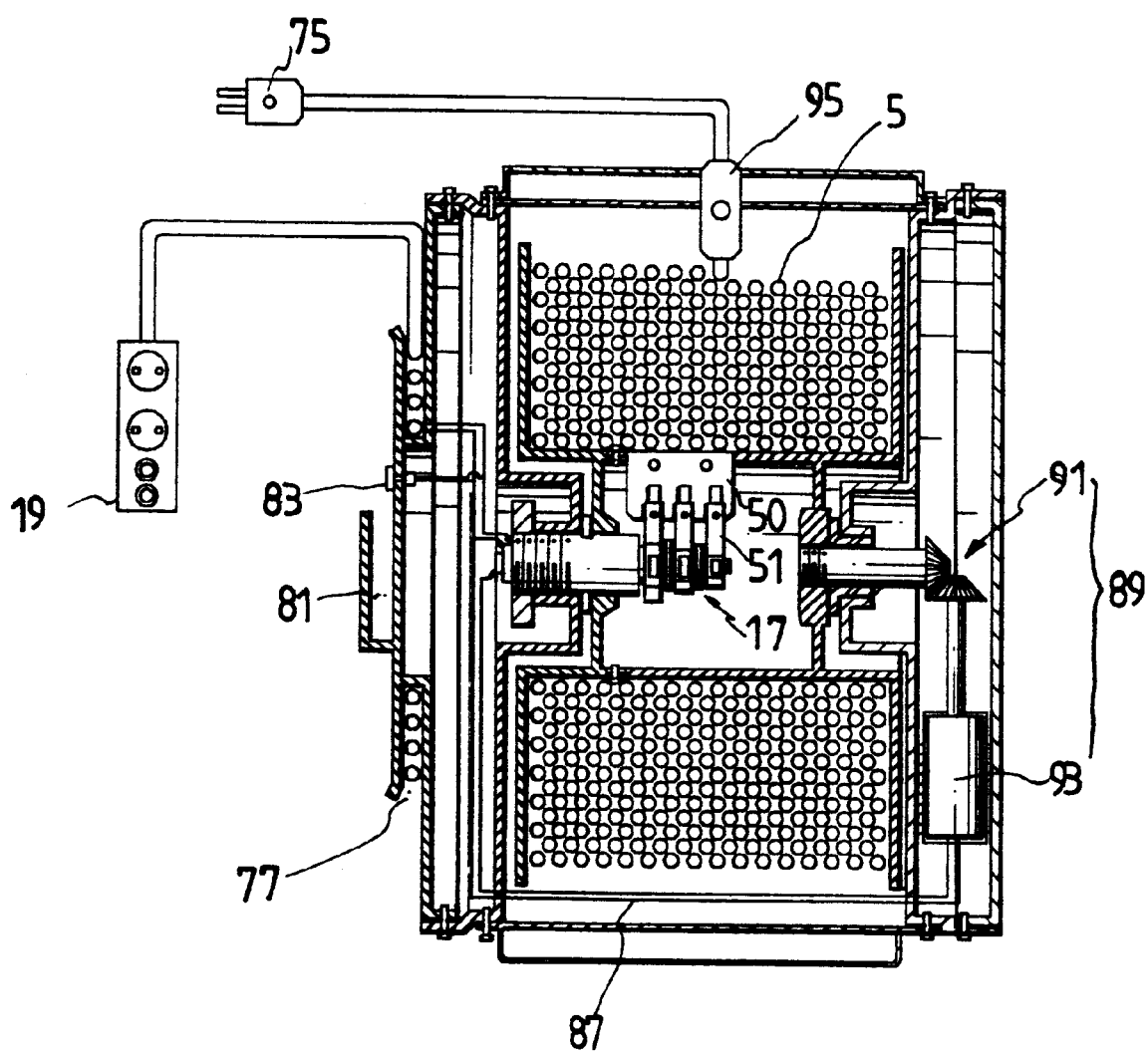
FIG. 8 is an overall perspective view for showing still another embodiment of a multipurpose wire winding device according to the present invention.

FIG. 5 is an overall perspective view for showing another embodiment of the multipurpose wire winding device according to the present invention. FIG. 6 is a vertical sectional view taken along the center of FIG. 5. FIG. 7 is a detailed, exploded sectional view of FIG. 5. FIG. 8 is an overall perspective view for showing still another embodiment of the multipurpose wire winding device according to the present invention.

Another embodiment of the multipurpose wire winding device of the present invention has a structure similar to that of the wire winding device described in FIGS. 1 to 3, namely, includes the rotary drum 9, the driving unit 13 and the power connecting unit 17. In addition to those three elements, the another embodiment referring to FIGS. 5 to 7 comprises: a pair of fixing side cylinder panels 69 coupled to each side of the rotary drum 9; a top fixing panel 71 and a bottom fixing panel 73 respectively coupled to upper and lower circumferences of the pair of the side cylinder panels 69, for mating and fixing the two side cylinder panels 69; a socket 75 provided at an end of the wire connected to an input of the power connecting unit 17, for receiving power from the outside; and the power outlet portion 19 provided at an end of the wire connected to an output of the power connecting unit 17, for supplying the power to the outside. The manual driving unit 27 of the driving unit 17 is disposed in one side cylinder panel 69, and a wire receiving portion 77 is formed in the other side cylinder panel 69 for receiving and keeping the wire connected to the power outlet portion 19. An outlet portion receiving portion 81 is formed in the wire receiving portion 77, for keeping the power outlet portion 19. On an inner surface of the coax hole 2 is provided a bush 79 between the coax hole 2 and the hollow shaft 33 so as to be sliding-connected to an outer surface of the hollow shaft of the manual driving unit 27. A power display unit 83 is disposed near to the outlet portion receiving portion 81, for informing a user that the power is being supplied.

Still another embodiment of the present invention is nearly the same as the multipurpose wire winding device shown in FIG. 5. Referring to FIG. 8, the rotary body connecting unit 53 in the power connecting unit 17 includes three contact brushes 51 disposed in line, toward a center of rotation. The fixed body connecting unit 55 in the power connecting unit 17 is provided with three cylindrical contact portions 57 having different lengths, for sequentially receiving three contact holes 67 of the three contact brushes 51. Two cylindrical insulators 85 are formed between the cylindrical contact portions 57. A cylindrical insulator 85 is formed around an outer surface of the most outer cylindrical contact portion 57, for the electrical insulation and for preventing friction with the coax hole 2 of the side cylinder panel 69. The conductive connection protrusion 65 formed at one end of the three cylindrical contact portions 57 is connected to an induction wire 87 which is connected to an automatic driving unit 89 for rotating the rotary drum 9. The automatic driving unit 89 is disposed at the same location as that of the manual driving unit 27. The automatic driving unit 89 comprises a power transmission gear 91 connected to the coax hole 2 of the rotary drum 9, for transmitting a torque generated from the outside, and a motor 93 for generating the torque to the power transmission gear 91 with a predetermined amount of power applied from the power connecting unit 17. The power transmission gear 91 is made in the form of a bevel gear which transmits power in a vertical direction.

A winding arrangement portion 95 is formed across an upper part of the pair of the side cylinder panel 69, for allowing the wire to be uniformly winded in the winding area when accommodating the wire into the winding area of the rotary drum using the automatic driving unit 89. The winding arrangement portion 95 reciprocates between the two side cylinder panels 69 and is moved in synchronization with the motion of the automatic driving unit 89.

The present invention allows electric power of a vehicle to be supplied to electric appliances at a remote place and gives a light, thereby satisfying various user necessities and maximizing convenience.

It will be apparent to those skilled in the art that various modifications and variations can be made in a multipurpose wire winding device for vehicles of the present invention without deviating from the spirit or scope of the invention. Thus, it is intended that the present invention covers the modifications and variations of this invention provided they come within the scope of the appended claims and their equivalents.

What is claimed is:

1. A multipurpose wire winding device for winding an electric wire thereon and supplying electric power from a power supply of a vehicle to a variety of target equipment, comprising:

a hollow cylindrical fixed housing;

a rotary drum coaxial and rotatably set within said housing for winding the electric wire around a hub thereof;

a cover mounted to an open end of said housing so as to close said open end to prevent an unexpected removal of said rotary drum from the housing;

a circular plate coaxially mounted to said rotary drum at a position outside said cover;

a handle provided on an outside surface of said circular plate at an edge of the plate and used for allowing a user to manually rotate the circular plate along with said rotary drum, thus winding or unwinding the wire;

a plug attached to an outside end of the electric wire and selectively connected to the power supply of the vehicle;

a lighting unit provided on the fixed housing and activated by the electric power supplied from the power supply through the electric wire, thus emitting light;

a power leading unit provided on said fixed housing and used for supplying the electric power from the electric wire to a target equipment; and a power connecting unit maintaining an electrical connection between the electric wire and both the lightning unit and the power leading unit regardless of a rotating action of the rotary drum within the fixed housing.

2. The multipurpose wire winding device according to claim 1, further comprising:

a motor activated by the electric power supplied from the power supply through the electric wire, thus generating torque; and a power transmission gear transmitting the torque from said motor to a rotating shaft of said rotary drum; thus automatically rotating the rotary drum.

3. The multipurpose wire winding device according to claim 1, wherein said power connecting unit comprises:

a rotary body connecting unit mounted to the hub of said rotary drum, thus being rotatable along with the rotary drum, said rotary body connecting unit radially extending toward a central axis of the rotary drum and having at least one radially extending contact brush, said contact brush being connected to the electric wire wound around the hub of the rotary drum; and a fixed body connecting unit coaxially mounted to the fixed housing and brought into movable contact with the contact brush of the rotary body connecting unit, thus maintaining the electrical connection between the electric wire and both the lighting unit and the power leading unit regardless of a rotating action of the rotary drum within the fixed housing.

4. The multipurpose wire winding device according to claim 1, wherein a wire arranging unit is provided within said fixed housing at a position above the hub of the rotary drum for evenly arranging the electric wire when the wire is wound around the hub of the drum.

5. The multipurpose wire winding device according to claim 1, wherein said lighting unit comprises at least one of a flasher and a lighting lamp.

6. The multipurpose wire winding device according to claim 1, wherein said power leading unit has at least one of a jack and a receptacle.

* * * * *